(12) United States Patent
Zhang et al.

(10) Patent No.: US 8,180,801 B2
(45) Date of Patent: May 15, 2012

(54) UNIFIED WINDOW SUPPORT FOR EVENT STREAM DATA MANAGEMENT

(75) Inventors: Jin Zhang, Shanghai (CN); Ying Yan, Shaghai (CN); Ming-Chien Shan, Saratoga, CA (US)

(73) Assignee: SAP AG, Walldorf (DE)

( * ) Notice: Subject to any disclaimer, the term of this patent is extended or adjusted under 35 U.S.C. 154(b) by 283 days.

(21) Appl. No.: 12/504,641

(22) Filed: Jul. 16, 2009

(65) Prior Publication Data

US 2011/0016160 A1    Jan. 20, 2011

(51) Int. Cl.
    *G06F 7/00* (2006.01)
(52) U.S. Cl. ......... 707/792; 707/794; 707/798; 707/805
(58) Field of Classification Search .................. 707/805, 707/792, 794, 798
See application file for complete search history.

(56) References Cited

U.S. PATENT DOCUMENTS

| 2006/0277230 | A1 | 12/2006 | Nishizawa et al. | |
|---|---|---|---|---|
| 2008/0016095 | A1 | 1/2008 | Bhatnagar et al. | |
| 2008/0120283 | A1* | 5/2008 | Liu et al. ........................... | 707/4 |
| 2008/0133465 | A1 | 6/2008 | Lee et al. | |
| 2009/0106214 | A1 | 4/2009 | Jain et al. | |
| 2009/0327257 | A1 | 12/2009 | Abouzeid et al. | |

OTHER PUBLICATIONS

Bose et al. "Data Stream Management for Historical XML data", Copyright 2004 ACM.*
Golab, L., et al., "Issues in Data Stream Management", SIGMOD Record, vol. 32, No. 2, Jun. 2003, pp. 5-14.
Abadi, D. J., et al, "Aurora: a New Model and Architecture for Data Stream Management", The VLDB Journal, vol. 12, 2003, pp. 120-139.
Arasu, A., et al, "The CQL Continuous Query Language: Semantic Foundations and Query Execution", The VLDB Journal, vol. 15, No. 2, 2006, pp. 121-142.
Chandrasekaran, Sirish et al., "TelegraphCQ: Continuous Dataflow Processing for an Uncertain World", Proceedings of the CIDR Conference, 2003, 12 pages.
Lundberg, Alan "Leverage Complex Event Processing to Improve Operational Performance", Business Intelligence Journal, vol. 11, No. 1, 2006, pp. 55-65.
Halevy, Alon et al., "Principles of Dataspace Systems", PODS' 06, Jun. 26-28, 2006, pp. 1-9.
CORAL8, Inc., "Coral8 CCL Reference", Copyright 2004-2008 Coral8, Inc., Version 5.5, 395 pages.

(Continued)

*Primary Examiner* — Etienne Leroux
*Assistant Examiner* — Cindy Nguyen
(74) *Attorney, Agent, or Firm* — Brake Hughes Bellermann LLP

(57) ABSTRACT

Data stream query mediation may utilize a query handler configured to receive a query from a stream application to be applied against a stream of data including multiple tuples representing events. A stream window manager may be configured to express the query in a specification which defines a window including a subset of the tuples, the specification defining content of the window as a range of the tuples having a range attribute over which the content is specified, defining when to update the window using a synchronization attribute specifying a movement of the window over time with respect to the content, and defining an evaluation of the content of the window using an evaluation attribute specifying when to perform the evaluation. A query translator may be configured to translate the query including mapping the range attribute, the synchronization attribute, and the evaluation attribute to a stream processing language of a data stream management system (DSMS), to thereby obtain a translated query. A DSMS mediator may be configured to provide the translated query to the DSMS for processing therewith.

20 Claims, 9 Drawing Sheets

OTHER PUBLICATIONS

Streambase, "StreamSQL Guide", Copyright 2004-2009, Stream Base Systems, Inc., 104 pages.
EsperTech, "Reference Documentation", Version 2.2.0, Copyright 2008, EsperTech Inc., 248 pages.
Jain, N., et al, "Towards a Streaming SQL Standard", PLVLDB'08, Aug. 23-28, 2008, pp. 1379-1391.
Botan, I., et al, "Extending XQuery with Window Functions", VLDB '07, Sep. 23-28, 2007, pp. 75-86.
"Open SQL", Sap Library—ABAP Programming (BC-ABA), Retrieved on May 26, 2009 from http://help.sap.com/saphelp_nw04/helpdata/EN/fc/eb3969358411d1829f0000e829fbfe/content.htm, 2 pages.
Arasu, Arvind et al, "Linear Road: A Stream Data Management Benchmark", Proceedings of the 30th VLDB Conference, 2004, pp. 480-491.
Zemke, F., et al, "Pattern Matching in Sequences of Rows (11)", Mar. 21, 2007, pp. 1-30.
Ghanem, T. M., et al, "Exploiting Predicate-window Semantics over Data Streams", SIGMOD Record, vol. 35, No. 1, Mar. 2006, pp. 3-8.
Ma, L., et al, "Condensative Stream Query Language for Data Streams", Australian Database Conference (ADC2007), 2007, 10 pages.
Hubert, B., "Lex and Yacc Primer/HOWTO", Version 0.8, Apr. 20, 2002, 22 pages.
Koch, C., et al, "Schema-based Scheduling of Event Processors and Buffer Minimization for Queries on Structured Data Streams", Proceedings of the 30th VLDB Conference, 2004, pp. 228-239.
Li, J. et al, "Semantics and Evaluation Techniques for Window Aggregates in Data Streams", ACM SIGMOD 2005, Jun. 14-16, 2005, pp. 311-322.
Flodin, S., et al, "Amos II Release 11 User's Manual", Version 2, Uppsala DataBase Laboratory, Nov. 25, 2008, 69 pages.
Chandrasekaran, S., et al, "Streaming Queries over Streaming Data", Proceedings of the 28th VLDB Conference, 2002, 12 pages.
Krishnamurthy, R., et al, "XML-to-SQL Query Translation Literature: The State of the Art and Open Problems", In Proc. of the 1st Int'l XML Database Symposium (XSym), Sep. 2003, 17 pages.
Patroumpas, K., et al, "Window Specification over Data Streams", In EDBT 2006 Work Shops, 2006, 20 pages.
MaxDB, "The Usage of MaxDB at SAP hosting", Max DB by My SQL, 2005, 18 pages.
Yu, Y., et al, "YAXX: YAcc eXtension to XML, a User Manual", Version 0.10, 9 pages.
Extended European Search Report for EP Application No. 10007250.3, mailed Oct. 7, 2010, 6 pages.

* cited by examiner

UNIFIED WINDOW SUPPORT FOR EVENT STREAM DATA MANAGEMENT

TECHNICAL FIELD

This description relates to event stream data management.

BACKGROUND

In traditional databases and data management systems, data is stored in an essentially static form within one or more computer memories. That is, the data may generally be altered when desired, but at any given moment the stored data represents a discrete, static, finite, persistent data set against which, e.g., queries may be issued.

In many settings, however, data may not be effectively or usefully managed in this way. In particular, it may occur that data arrives essentially continuously, as a stream of data points corresponding, e.g., to real-world events. Consequently, data stream management systems (DSMS) have been developed to make effective use of such data.

For example, data representing the price of a particular stock may generally fluctuate over the course of a day, and a data stream management system may continuously receive updated stock prices, e.g., at equal time intervals or as the price changes. Other examples of such data streams include temperature or other environmental data collected by sensors, computer network analytics, patient health data collected at a hospital, or data describing a manufacturing process or other business process(es).

Because such data streams may be received in a rapid and/or unpredictable way(s), perhaps from distributed, heterogeneous sources, and may be time-varying and essentially unbounded, they present challenges for effective use and processing of the contained data. Such challenges may be exacerbated by inconsistencies in syntax, semantics, and other data handling aspects of existing data stream management systems.

SUMMARY

According to one general aspect, a computer system including instructions recorded on a computer-readable medium may include a query handler configured to receive a query from a stream application to be applied against a stream of data including multiple tuples representing events. The system may include a stream window manager configured to express the query in a specification which defines a window including a subset of the tuples, the specification defining content of the window as a range of the tuples having a range attribute over which the content is specified, defining when to update the window using a synchronization attribute specifying a movement of the window over time with respect to the content, and defining an evaluation of the content of the window using an evaluation attribute specifying when to perform the evaluation. The system may include a query translator configured to translate the query including mapping the range attribute, the synchronization attribute, and the evaluation attribute to a stream processing language of a data stream management system (DSMS), to thereby obtain a translated query, and a DSMS mediator configured to provide the translated query to the DSMS for processing therewith.

Implementations may have one or more of the following features. For example, the system may include a result manager configured to receive query results from the DSMS and provide the results to the stream application. The range attribute may include a specification of a number of the tuples, a specification of time, a specification of one or more fields of the stream of data, and/or a specification of a detected pattern associated with the tuples. The synchronization attribute may include a specification of a number of the tuples, a specification of a time to update the window, and/or a specification of a detected pattern associated with the tuples. The evaluation attribute may include a specification of one or more of the tuples, a specification of time to evaluate the window, and/or a specification of a detected pattern associated with the tuples to trigger evaluation of the window.

The query translator may include a compiler configured to parse the query, and may be further configured to select a mapping table associated with a query language associated with the DSMS and to execute therewith a mapping of the parsed query to provide a syntax translation, semantic translation, and behavior translation of the query to obtain the translated query. The stream of data may include one or more stream of data expressed as either relational or XML data streams, or combinations thereof.

According to another general aspect, a computer-implemented method may include receiving a query from a stream application to be applied against a stream of data including multiple tuples representing events, and expressing the query in a specification which defines a window including a subset of the tuples, the specification defining content of the window as a range of the tuples having a range attribute over which the content is specified, defining when to update the window using a synchronization attribute specifying a movement of the window over time with respect to the content, and defining an evaluation of the content of the window using an evaluation attribute specifying when to perform the evaluation. The method may include translating the query including mapping the range attribute, the synchronization attribute, and the evaluation attribute to a stream processing language of a data stream management system, to thereby obtain a translated query, and providing the translated query to the data stream management system for processing therewith.

Implementations may include one or more of the following features. For example, the method may include receiving query results from the DSMS and providing the results to the stream application. The translating the query may include parsing the query, selecting a mapping table associated with a query language associated with the DSMS, and executing therewith a mapping of the parsed query to provide a syntax translation, semantic translation, and behavior translation of the query to obtain the translated query.

According to another general aspect, a computer program product may be tangibly embodied on a computer-readable medium and may comprise instructions that, when executed, are configured to cause a data processing apparatus to receive a query from a stream application to be applied against a stream of data including multiple tuples representing events and express the query in a specification which defines a window including a subset of the tuples, the specification defining content of the window as a range of the tuples having a range attribute over which the content is specified, defining when to update the window using a synchronization attribute specifying a movement of the window over time with respect to the content, and defining an evaluation of the content of the window using an evaluation attribute specifying when to perform the evaluation. The instructions, when executed, may be configured to execute the data processing apparatus to translate the query including mapping the range attribute, the synchronization attribute, and the evaluation attribute to a stream processing language of a data stream management system, to thereby obtain a translated query, and provide the translated query to the data stream management system for processing therewith.

Implementations may include one or more of the following features. For example, the instructions may further cause the data processing apparatus to receive query results from the DSMS and provide the results to the stream application. The instructions may further cause the data processing apparatus to translate the query including parsing the query, selecting a mapping table associated with a query language associated with the DSMS, and executing therewith a mapping of the parsed query to provide a syntax translation, semantic translation, and behavior translation of the query to obtain the translated query The details of one or more implementations are set forth in the accompanying drawings and the description below. Other features will be apparent from the description and drawings, and from the claims.

DETAILED DESCRIPTION

Figure 1:
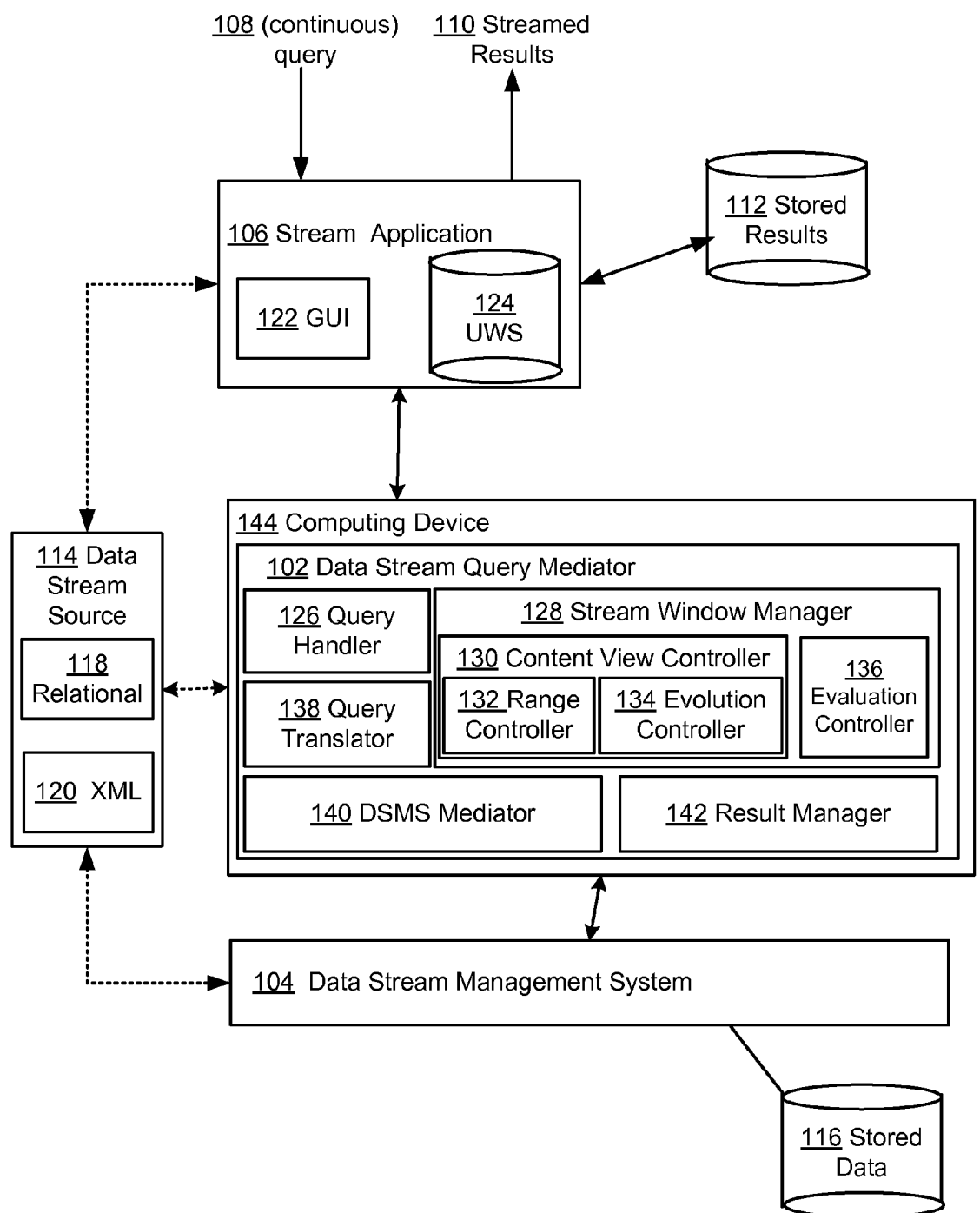
FIG. 1 is a block diagram of a system for unified window support for event stream data management.

FIG. 1 is a block diagram of a system 100 for unified window support for event stream data management. In the example of FIG. 1, a data stream query mediator 102 is situated between a data stream management system (DSMS) 104 and a stream application 106, and provides a unified, integrated framework for translating and otherwise mediating interaction(s) between the DSMS 104 and the stream application 106. As a result, the data stream query mediator 102 may serve as a middleware which makes the stream application 106 portable between different examples of the DSMS 104, and allows the stream application 106 to use a single, unified language (e.g., syntax and semantics) for specifying interactions with the one or more examples of the DSMS 104. In this way, a user of the stream application 106 may experience the benefits of the one or more examples of the DSMS 104 in a simple, reliable way, without having to learn multiple languages to do so. In other words, the data stream query mediator 102 may function as a gateway over the existing data stream management system(s) 104, and may provide, e.g., a single standard API and language for heterogeneous data input, query, and event handling. As described below, such a standard API and language may be used by virtually all such stream applications 106 needing stream analysis.

In FIG. 1, then, it may be seen that a query 108, such as a continuous query, may be received at the stream application 106, e.g., from a user or other system/service, and that, for example, either streamed results 110 and/or stored results 112 may be provided in return. The query 108 may be executed against a data stream of a data stream source 114, which is shown in FIG. 1 as being received at the DSMS 104. As shown, at least some of the data in the data stream may be stored in stored data database 116. As shown in FIG. 1 and as referenced below, it is possible for some or all of the data stream from data stream source(s) 114 to be received at the stream application 106 or at the data stream query mediator 102, as well.

The DSMS 104 may represent a modified, conventional, or substantially conventional DSMS. Thus, the DSMS 104 also may be referred to using other conventional names, such as, e.g., (BEPS) business event processing system, SPE (Stream Processing Engine), or CEP (Complex Event Processing). In any case, the DSMS 104 may be understood to represent a system which receives or otherwise interacts with the data stream of the one or more data stream source(s) 114.

As referenced above, such data streams are known to exist in a variety of circumstances and settings. To give just a few examples, the DSMS 104 may receive data streams representing or related to (events occurring within or with respect to) network monitoring, network traffic engineering, telecom call records, financial applications, sensor networks, manufacturing processes, web logs and click streams, and massive data sets which are streamed as a way of handling the large volume of data. Such data streams may thus arise in enterprises (large or small), within and across government agencies, large science-related collaborations, libraries (digital or otherwise), battlefields, or in "smart" homes.

As is known, such data stream(s) may be continuous, unbounded, rapid, noisy, and time-varying. Moreover, such data streams may be heterogeneous, e.g., in their form/format and/or with respect to the source(s) from which the data streams originate. For example, the data received may be relational 116 (e.g., represented in a relational data analogous to a traditional relational database) or XML 118 (e.g., represented as eXtensible Markup Language (XML) data). Consequently, it may be necessary to deal with both streaming relational and XML data, combine them, and publish results in any combination of the two formats.

For example, it may occur that a customer order is not delivered correctly. Involved applications (one or more of which may represent the stream application 106, data stream source(s) 114/118/120) may include an Enterprise Resource Planning (ERP) application, a Customer Relationship Management (CRM) application, a Business Intelligence (BI) application, and/or a data warehouse (DW) application. The ERP application may provide a relational data stream while the BI application may provide an XML data stream. The CRM may need to receive events related to order receipt, order assembly, order delivery, or other aspects of providing the order, so as to be able to determine the cause of the problem and interact with the customer to address concerns of the customer regarding the erroneous order. Thus, as described herein, the system 100 helps to provide an integrated platform that can recognize events and patterns from such different heterogeneous information resources in a real time manner.

In order to be able to obtain desired data/results 110/112, a user of the stream application must be able to specify the query 108 in a well-understood and convenient manner, and in a manner that yields the desired results. For example, if a user desires an average stock price of a stock, determined from the ten succeeding prices following any change of more than x % in price, the user must be able to so specify. It may be understood that in such a case, and in similar cases, the user may attempt to specify such a desire but may do so incorrectly. In this case, the user may receive results 110 which are incorrect, yet the user may not know the results are incorrect. Therefore, it is important that the user be able to specify the query 108 in a predictable, correct manner.

In FIG. 1, the stream application 106 is illustrated as including a Graphical User Interface (GUI) 122 with which the user may submit the query 108. Of course, the GUI 122 is just an example, and it may be understood that other query entry techniques may be used. The GUI 122 may be a specialized GUI associated with the data stream query mediator 102, or may be an otherwise-standard GUI associated with the stream application 106. The query 108 also may be received from a separate application or source and provided to the stream application 106 therefrom.

The query 108 may be constructed using unified window semantics 124, which is shown in FIG. 1 as being associated with the stream application 124, but which may additionally or alternatively be associated with the data stream query mediator 102 and/or the DSMS 104. In this context, the term window, as described in detail below refers to a discrete, defined section or portion of the received data stream(s) over which (or against which) the user desires the query to be evaluated. A window thus specifies a finite set of recent events, items, or other discrete elements (referred to herein as "tuples") from the otherwise-unbounded data stream. This finite portion of the stream is subsequently used to evaluate the query and produce results corresponding to that time instant. As time advances, fresh items may be included into the window at the expense of older tuples that stop taking part in computations (and perhaps may get discarded altogether). In general, windows may be desired to evolve in a prescribed mode keeping up with the continuous arrival of data items. For example, a simple window on a received data stream may specify "the most-recent 10 events" or "all the events in the last 10 seconds," or "all events occurring between an event of type 1 and an event of type 2."

Aside from such simple examples, it may be appreciated that there are many types of windows which may be specified, and such windows may change or update over time or in response to some event (examples of different windows are provided below, e.g., with respect to FIG. 3 and FIGS. 8A-8E). Existing DSMS languages exist, as described below, each of which provide a semantics and syntax for specifying a window for a data stream. It may therefore be difficult for a user to specify a desired window and obtain a desired result, since the semantics and syntax of these languages may be difficult or non-intuitive to use, and since a user must master as many of these different languages as may be needed to interact with different examples of the DSMS.

In FIG. 1, then, the data stream query mediator 102, in conjunction with the UWS 124, may be used to provide integration for a variety of heterogeneous event information resources, as well as a standard query/window specification language to perform various kinds of queries. The data stream query mediator 102 thus provides a framework that integrates the representation of at least the two kinds of event streams (relational and XML streams) referenced above, and supports unified event processing with a general window specification (UWS 124). The UWS 124 is semantically clear and easy to understand, and may be used to express all conventional window types, and may be extended to specify new or future window types. Furthermore, the data stream query mediator 102 may translate queries expressed in the UWS 124 into other vendor-specific stream processing languages of many different types of the DSMS 104.

Thus, the data stream query mediator 102 may include a query handler 126 which is configured to receive the query 108 from the stream application 106 to be applied against a stream of data, e.g., from the stream data source(s) 114, where the data stream may include multiple tuples representing events. The query handler 126 may represent or include all or part of an application program interface (API) for interacting with the stream application 106. Thus, different stream applications may be built to interact with the single query handler 126, but may nonetheless interact with (or be portable between) different examples of the DSMS 104.

The data stream query mediator 102 may further include a stream window manager 128 that is configured to express the query 108 in a specification (e.g., the UWS 124) which defines a window including a subset of the tuples. A content view controller 130 may be used to define content of the window, including a range controller 132 specifying a range of the tuples using a range attribute over which the content is specified, and an evolution controller 134 defining when to update the window using a synchronization attribute specifying a movement of the window over time with respect to the content thereof. Then, an evaluation controller 136 may be used to define an evaluation of the content of the window using an evaluation attribute specifying when to perform the evaluation. Specific examples of the controllers 130-136 and their effect(s) are provided below, e.g., with respect to FIG. 3.

A query translator 138 may be configured to translate the query including mapping the range attribute, the synchronization attribute, and the evaluation attribute to a stream processing language of the DSMS 104, to thereby obtain a translated query. A DSMS mediator 140 may be configured to provide the translated query to the DSMS 104 for processing therewith, and a result manager 142 may be configured to retrieve results from the DSMS 104 and provide them to the stream application 106. For example, the DSMS mediator 140 and the result manager 142 may be part of an API(s) which, like the query handler 126, is configured to interact with the stream application 106 and ensure the portability of the stream application built or configured to use the UWS 124 between different examples of the DSMS 104.

Thus, the UWS 124 and the data stream query mediator 102 provide a stream query language that is convenient to learn and use, and that is widely-applicable among many different data stream management systems. Such a stream query language may be based on, or may use, existing language or language structures if not otherwise specified herein. For example, the stream query language may be based on Open SQL used in existing data stream management systems, which was extended from, and served as, a common language for traditional databases. To the extent that such languages are known, they are not described here in detail. Rather, the present description is generally directed to specifying operations on the data stream(s), and, in particular, to the semantics and syntax of window specification, such as in the UWS 124.

In FIG. 1, the UWS 124 is based on window specification using the three parameters of the controllers 132, 134, 136, i.e., a range (extent), evolution (synchronization), and evaluation of the underlying tuples. Thus, such a specification may be referred to as a 3E policy or framework (extent/evolution/evaluation). In these semantics, the following terminology and nomenclature may be used.

Specifically, the extent policy governed by the range controller 132 may be referred to as the α-policy, and may specify the portion of the window content related to which tuples are included in the window. The evolution policy may be governed by the evolution controller 134 and may be referred to as the β-policy and used to indicate another aspect of the window content, e.g., the manner in which a window evolves or updates, such as over time or in response to some event. Finally, the evaluation policy may be governed by the evaluation controller 136 and may be referred to as the χ-policy, and may indicate an evaluation frequency or other evaluation characteristic of the window.

Thus, α-policy indicates the "range" of a window, that may be expressed, e.g., either as the number of tuples included in it or as the temporal interval spanning its contents. The range of a window may be measured, for example, in logical units, such as in timestamp values as described herein. Hence, a time-based window may be derived from the time interval spanning its contents. Physical units may also be used, specifying the number of tuples falling within a window's bounds. Example variants include tuple-based and partitioned windows, as described herein. In other examples, more flexible rules may be used to detect more complex events. For example, pattern recognition may be used in α-policy to obtain a pattern or pattern-based window (such as recurring events, alternating events, or other patterns).

β-policy indicates the mode of adjustment as time advances, tuple(s) arrive(s) or a specified event happens. This property thus determines whether and how a window changes its state over time. A window generally changes its contents progressively, either due to the arrival of new streaming tuples or because of the advancement of time. Therefore, transitions between any two successive states of a window may be carried out at in various scenarios. For example, in a unit step, the window's bounds advance smoothly, one tuple-at-a-time, or at every discrete time instant (assuming that a global clock exists). In a hop, multiple time instants or a specific number of tuples may be spanned. Depending on whether this hop size is smaller or larger than the window size, an overlapping or non-overlapping window extent(s) may be created, respectively. In an event trigger, window content may be updated when a specified event occurs. Many use cases can use this window to detect complex event patterns. For example, the window may be updated when a stock price is larger than a certain price.

As shown in FIG. 1, α-policy and β-policy, as controlled respectively by the range controller 132 and evolution controller 134, are both part of the control aspect(s) of the content of a window at any given time. On the other hand, the evaluation controller 136 defines what is referred to herein as χ-policy which is related to the specification of a separate time, event, or other trigger which causes a specified use or analysis of the window contents.

It is possible to define evaluation simply in terms of the window updates caused by the evolution controller 134, i.e., to cause an evaluation of the window contents every time the window contents change. However, defining an evaluation policy separately from the evolution policy provides a number of advantages. Specifically, for example, such a policy definition enables condensative query processing over data streams (e.g., operations such as SUM which reduce or compress an amount of information from the window). Such a policy enables the generation of efficient continuous query plans and can be used to validate query optimization, especially in blocking query operations, such as JOIN. Such a policy further provides an easy way to support complex window types, such as a mixed jumping window, sampling window, and even more complex window types in a declarative fashion, as explained in more detail, below.

Herein, it may be understood that, in general, window specification is achieved by means of a windowing attribute that helps in establishing order among stream items, which may typically include a timestamp or other time-ordering attribute. As an addition or alternative to timestamp(s), any monotonic sequence of numbers may be used to serve as a means for ordering tuples, e.g., tuple arriving order or a unique serial number attached to each tuple. Even if timestamps are used, it may occur that more than one tuple may arrive with a same timestamp, so that tuple arriving order (referred to as internal rank) may be used to further distinguish the order between these simultaneous tuples. Then, timestamp and internal rank together may define the total order (referred to herein as the external rank) of a stream. Therefore in the following, timestamp and external rank attributes (denoted respectively as ts and rank) may be used for obtaining tuples qualifying for a policy P.

In the present description, the following syntax and semantics are used as examples for implementing the data stream query mediator 102 of FIG. 1 using the UWS 124. Specifically, a window may be specified by stating WINDOW window_identifier (RANGE α_value [RATTR] {TUPLE(S)|TIME|ON FIELD field|PATTERN patterns}; [PARTITION BY fieldlist] SYNC β_value [SATTR] {TUPLE(S)|TIME|WHEN condition1}; [EVALUATE χ_value [EATTR] {TUPLE(S)|TIME|WHEN condition2}]).

In the preceding, RANGE refers to the content of the window as defined by the range controller 132, which, as already explained, defines a policy defining what data should be included in the window, so that RATTR (Range ATTRibute) is the attribute over which RANGE is specified. Such an attribute may include, as referenced above, TUPLE(S), TIME, or ON FIELD. In the latter example, PARTITION BY identifies fields that are used to group the incoming tuples. PATTERN, as also referenced above, identifies a pattern of tuples or other events or occurrences which may be used to define the window content.

SYNC refers to the evolution of the window as controlled by the evolution controller 134, and defines the step by which the window moves, i.e., when to update the content of the window. Then, the SATTR (Synchronization ATTRibute) is the attribute over which SYNC is specified, and may include TUPLE(S), TIME, and/or WHEN (e.g., a pattern of event indicates when to update the window)

EVALUATE refers to the evaluation and computing frequency applied to the window, as controlled by the evaluation controller 136. Then, EATTR (Evaluation ATTRibute) is the attribute over which EVALUATE is specified, and may include TUPLE(S), TIME, and/or WHEN (e.g., a pattern indicating when to evaluate a window and provide the results).

Virtually all types of windows may be expressed using the techniques of FIG. 1, including known window types (examples of which are provided below, e.g., with respect to FIGS. 3 and 8A-8E). Moreover, the techniques may easily be used to express newly-created window types, as these become available.

Thus, FIG. 1 provides a system(s) and method(s) for specifying and executing queries against a data stream. As shown in FIG. 1, the data stream query mediator 102 may be implemented on a computing device 144, which may represent virtually any conventional computing device having associated hardware (e.g., processor, memory, or display device(s)) and software needed for the implementation. Although in FIG. 1 only the data stream query mediator 102 is illustrated as being executed using the computing device 144, it may be appreciated that the DSMS 104 and/or the stream application 106 may be executed thereon as well, or may be executed on separate computing devices, not specifically shown in FIG. 1. In the latter case, the various separate computing devices may be in communications with one another by way of a network, such as the Internet or a private (e.g., enterprise-wide) network. For example, the stream application 106 may run locally on a client computer, while the computing device 144 may represent a remote server computer executing both the data stream query mediator 102 and the DSMS 104. Other configurations would be apparent to one of skill in the art.

Figure 2:
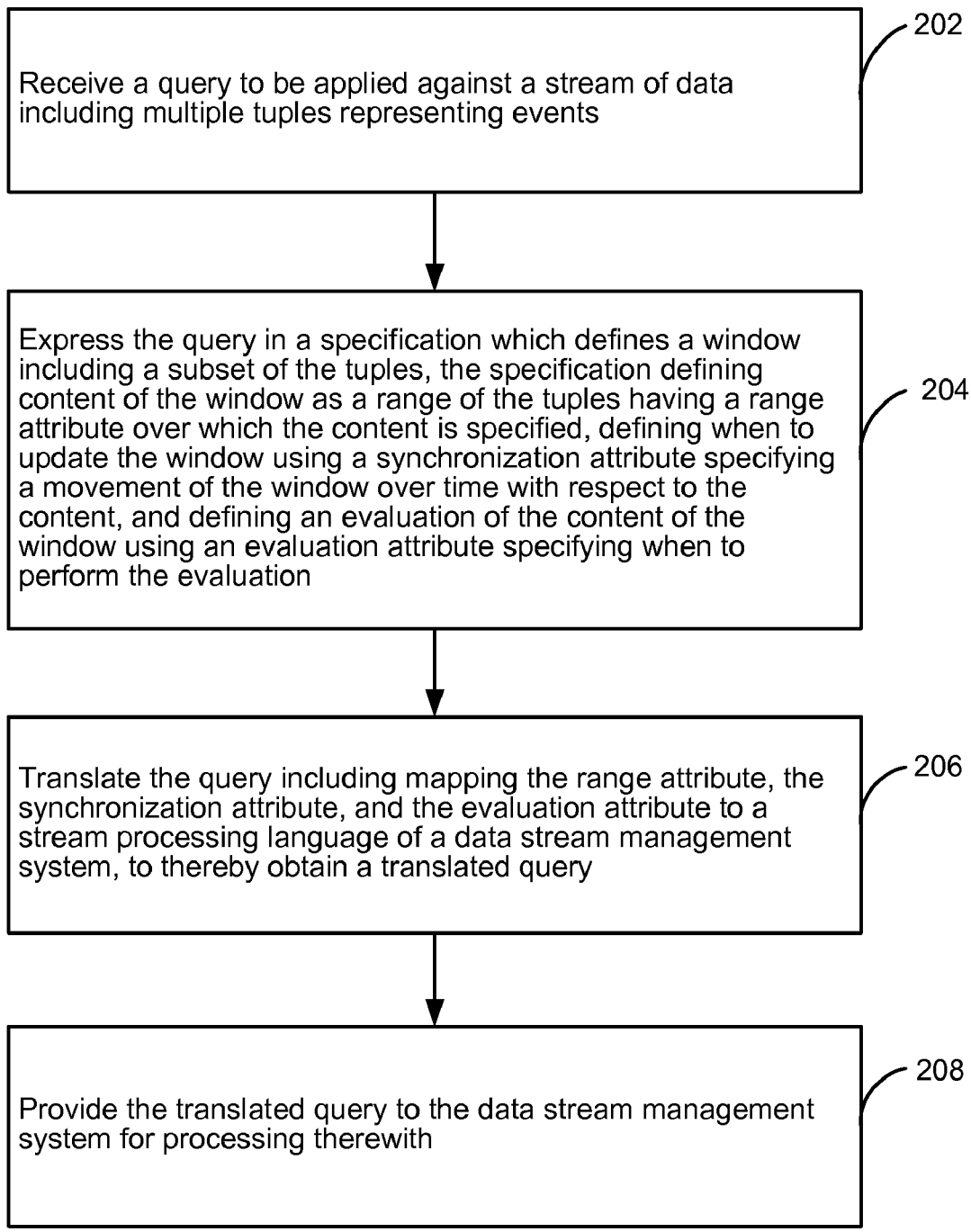
FIG. 2 is a flowchart illustrating example operations of the system of FIG 1.

FIG. 2 is a flowchart 200 illustrating example operations of the system of FIG. 1. In FIG. 2, operations are illustrated in a sequential order. However, it may be appreciated that such illustration is for the sake of example, and, if not otherwise required, operations may in fact be performed wholly or partially in parallel or in an overlapping fashion, or in a different order than that shown.

In FIG. 2, a query to be applied against a stream of data including multiple tuples representing events may be received (202). For example, the query handler 126 may receive the query 108 specified using the UWS 124 from the stream application 106, as shown in FIG. 1, for a stream of data such as described with respect to FIG. 3, below.

Specifically, the query may be expressed using a specification which defines a window including a subset of the tuples, the specification defining content of the window as a range of the tuples having a range attribute over which the content is specified, defining when to update the window using a synchronization attribute specifying a movement of the window over time with respect to the content, and defining an evaluation of the content of the window using an evaluation attribute specifying when to perform the evaluation (204). For example, the stream window manager 128 may be used to implement the range controller 132, the evolution controller 134, and the evaluation controller 136 to specify the referenced attributes, as described herein.

The query may be translated including mapping the range attribute, the synchronization attribute, and the evaluation attribute to a stream processing language of a data stream management system, to thereby obtain a translated query (206). For example, the query translator 138 may be used to execute the translation, as described in detail, below, e.g., with reference to FIGS. 5 and 6.

The translated query may be provided to the data stream management system for processing therewith (208). For example, the DSMS mediator 140 may provide the translated query to the DSMS 104, as shown in FIG. 1 and described in detail herein.

Figure 3:
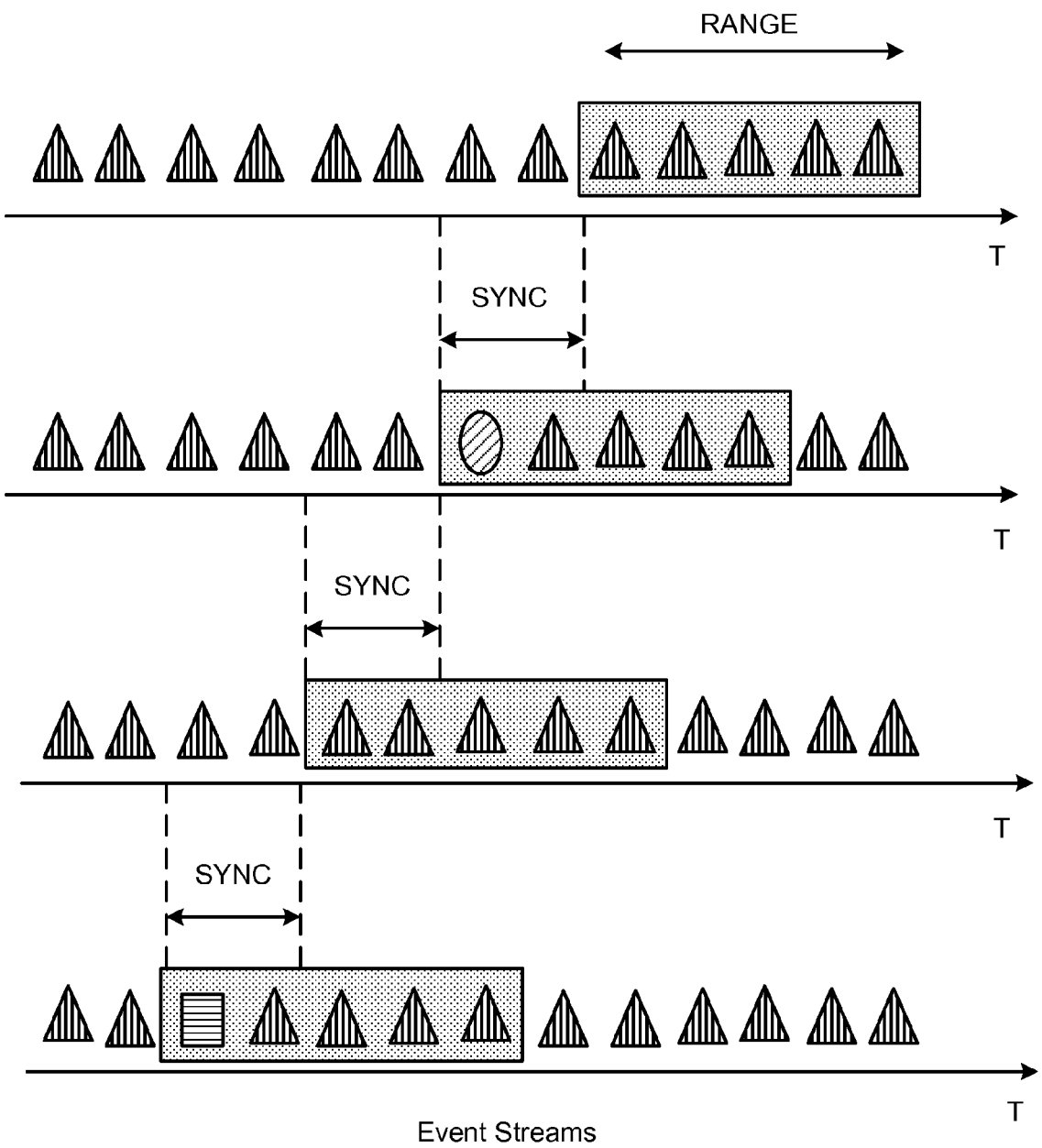
FIG. 3 is a timing diagram of a data stream and associated window definitions used in the system of FIG. 1.

FIG. 3 is a timing diagram of a data stream 300 and associated window definitions used in the system of FIG. 1. Specifically, FIG. 3 provides a simple example for the sake of illustration in which, using the syntax and semantics outlined above, a window 302 (shown in FIG. 3 as evolving over time as windows 302a-302d) is defined as RANGE 5 TUPLES, SYNCH 2 TUPLES, EVALUATE WHEN EVENT a OR b. That is, as shown, a range or extent of the window 302a as controlled by the range controller 132 is 5 tuples long, which is constant and consistent throughout all of windows 302a-302d. however, the specific 5 tuples which are included in each of the individual windows 302a-302d change over time, because the window has an evolution in which a new synchronization (SYNCH) occurs every 2 tuples. Then, evaluation may occur when event a 304 and later event b 306 occur.

For example, if the data stream 300 represents a stream of stock prices, which each tuple is a specific price at the current time, then the evaluation may be an averaging of the stock price using the 5 tuples of the window 302. Every time two new stock prices arrive, the window 302 moves (e.g., from the window 302a to the window 302b). Event a 304 may represent a first stock price which triggers calculation of the average. For example, the evaluation controller 136 may compute the average of the 5 tuples within window 302b when the event a 304 indicates that the stock price has reached the first trigger price. Then, the window may update to the window 302c before updating to the window 302d and reaching the second event b 306 which may represent a second trigger price for evaluating the average price, this time of the 5 tuples within the window 302d. It may be observed, then, that actual calculations (evaluations) may be executed only when desired, so that it is not necessary to perform calculations every time the window updates. Further, the window 302 may be specified in an easy, intuitive manner which is assured of capturing only the desired tuples, and which may flexibly define the desired tuples as well as an evaluation thereof.

Figure 4:
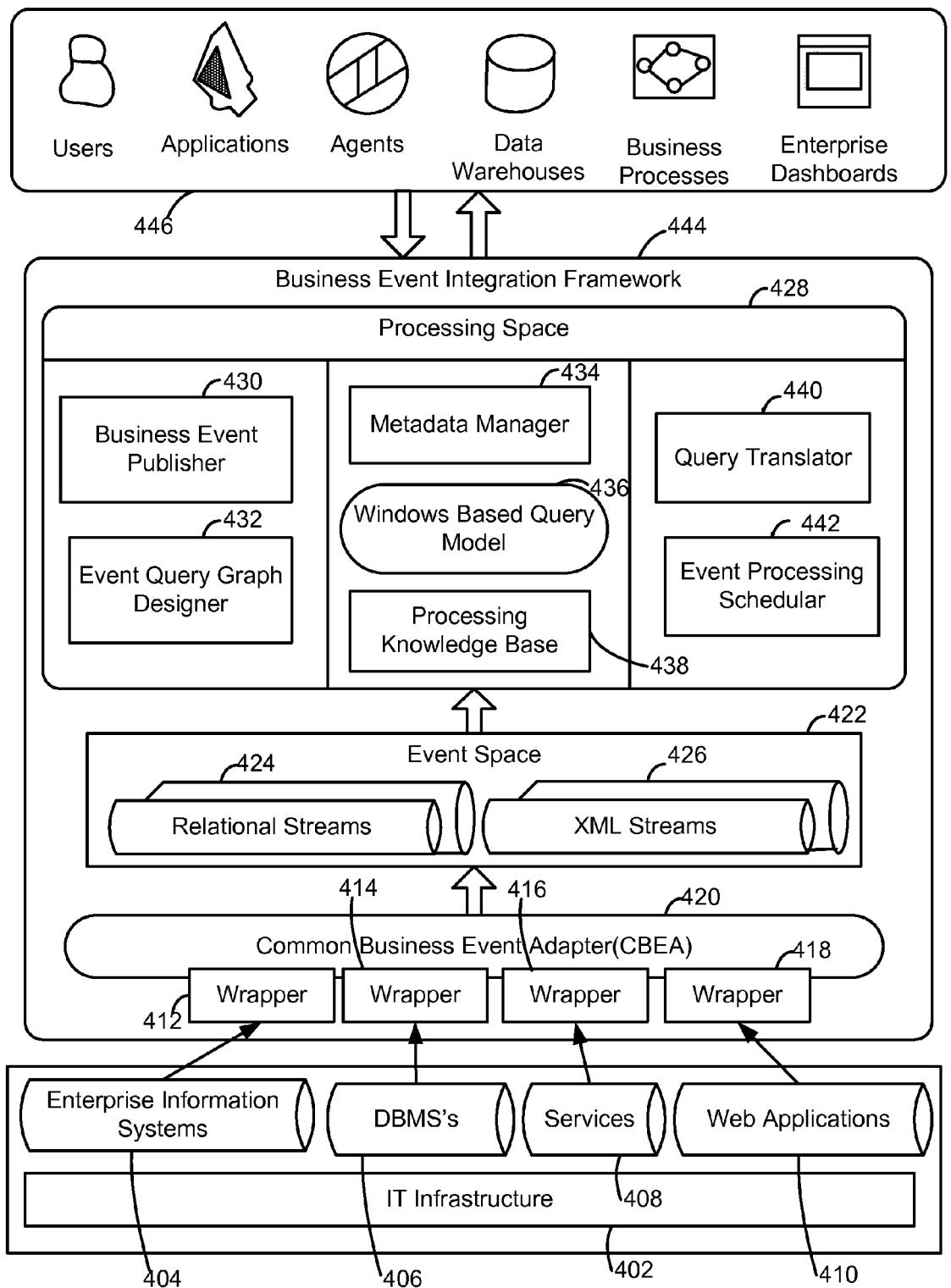
FIG. 4 is a block diagram of an alternate implementation of the system of FIG. 1.

FIG. 4 is a block diagram of an alternate implementation of the system of FIG. 1. In FIG. 4, various heterogeneous data sources are illustrated for the sake of example as including an information technology (IT) infrastructure 402, enterprise information systems 404, database management systems (DBMSs) 406, services 408, and web applications 410. Such data sources are well known and are not explained in detail here other than to identify them as data sources which may provide data in various formats and manners which may be difficult for a conventional system to use in an easy and integrated manner, but which the systems of FIGS. 1 and 4 may utilize in a comprehensive, intuitive and straight-forward manner.

In particular, FIG. 4 illustrates a business event integration framework (BEIF) 444. The BEIF 444 may represent or otherwise be associated with components of the data stream query mediator 102 of FIG. 1, as well as additional or alternative components as described herein.

Thus, the various data sources 402-410 may output either relational and/or XML data as referenced above, and may do so using various known (e.g., vendor-specific) formats, protocols, syntax, and semantics. Consequently, wrappers 412-418 may be included as part of a common business event adaptor (CBEA) 420 within the BEIF 444. Thus, the CBEA 420 provides various types of wrappers 412-418 to access heterogeneous event data sources 402-410. In order to access data streams from external data sources, the CBEA 420 may use the wrappers 412-418 to process data streams from the different kinds of external data sources 402-418, which may include, e.g. JDBC (Java Database Connectivity) based access to relational databases, access to XML files, ERP systems, Web Services, or Internet Web applications, as shown A wrapper 412-418 may include a program module in the CBEA 420 having specialized facilities, including one or more interfaces to external data repositories to obtain both metadata (such as schema definitions) and data. Once a wrapper has been defined for a particular kind of source, the CBEA 420 knows how to process any stream query or view definition for all such sources.

An Event Space 422 is utilized to cache formatted event data, and execute some pre-processing calculations, such as, e.g., virtual event attribute appending or out-of-order processing. As shown, the event space 422 may cache relational data streams 424 and/or XML data streams 426.

Then, a processing space 428 may include a number of components which interact with the event space 422. For example, a Metadata Manager 434 may be utilized to manage all the metadata existing in the BEIF 444, including global/local schema, event specification, and stream specification. A Window Based Query Model (WBQM) 436 is analogous to and/or associated with the UWS 124 of FIG. 1, and thus is associated with providing a standard data stream and query model.

A Query Translator (QT) 440 may be used to parse and translate the standard stream language into different vender-specific stream languages, as described herein. For example, such vender-specific stream languages may include Coral8 CCL, Esper EPL, StreamBase StreamSQL, and Extended XQuery. An Event Processing Scheduler (EPS) 442 makes a plan for the user-defined stream queries, and carries out scheduling optimizations while considering parallel query processing. The EPS 442 may then transmit the user query together with the event stream to various kinds of DSMS products, such as, e.g., StreamBase, Oracle CEP, Coral8 or Truviso. Meanwhile, a Processing Knowledge Base (PKB) 438 provides the necessary knowledge for event processing, including, e.g., business context, domain knowledge, event correlation information and translation knowledge. The knowledge stored in PKB 438 may be stored as numerous rules which can be efficiently consumed by other components of the BEIF 444

An Event Query Graph Designer (EQGD) 432 may be used to provide users or applications a visualization workbench to define business event patterns. For example, the EQGD 432 may be associated with the GUI 122 of FIG. 1, so that a user may easily define desired fields, events, or patterns to be used in defining or evaluating a desired window. A Business Event Publisher (BEP) 430 provides business event output adapter to connect with ultimate consumers 446, such as, in the examples shown, business users and applications, agents, data warehouses, business processes or enterprise dashboards.

Thus, as described above with respect to FIGS. 1-3, interactions may occur between a stream application (e.g., 446 or 106), the BEIF framework 444, and a stream processing system (e.g., the DSMS 104 of FIG. 1), in which the stream application(s) and the DSMS talk only to the BEIF 444. Specifically, in the first instance, applications may model stream queries in the standard stream language described herein, and the BEIF 444 creates a local metadata for the submitted queries and then forwards them to the target stream processing system using a necessary language translation method. Then, the applications may feed stream data to the BEIF 444 (which may optionally make the data persistent) and then forwards the data to the underlying stream processing system. When the underlying stream processing system detects a predefined event, the BEIF 444 then translates the event back to the application(s) and makes the result available through the necessary API. For example, applications may submit queries via a standard API (such as, e.g., an enhanced JDBC). Thus, stream queries may be translated into vendor-specific languages, and the translated queries may be sent to the underlying stream processing system by an appropriate wrapper 412-418 which drives the underlying system through vendor-specific API(s).

As referenced above, the data stream query mediator 102 (e.g., the BEIF 444) may be used to make stream applications portable across underlying technology platforms, such as, e.g., event processing systems, databases, and operating systems. For such portability across multiple relational databases, the BEIF 444 uses Open SQL as a variant of SQL standard language, in which an underlying DBI (Data Base Interface) layer does required mapping to underlying databases using vendor-specific DBSL libraries. The BEIF framework 444 defines an extension of SQL for stream processing in which a common feature subset of available stream languages is used and identified in the parsing/translation. As already mentioned, examples of such translations are provided below with respect to, e.g., FIGS. 5 and 6.

Figure 5:
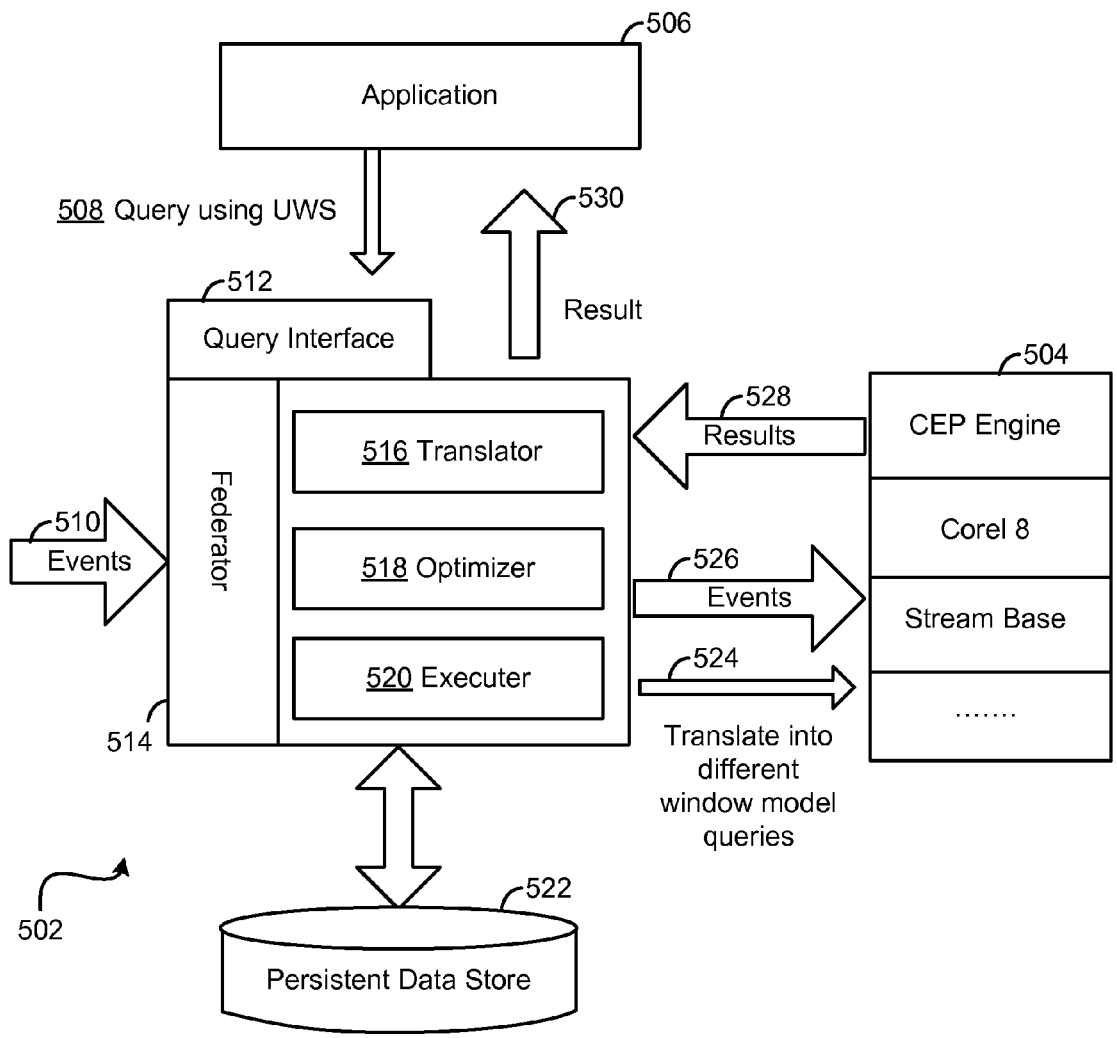
FIG. 5 is a block diagram of another alternate implementation of the system of FIG. 1.

FIG. 5 is a block diagram of another alternate implementation of the system of FIG. 1. In FIG. 5, an integration framework 502 provides an example implementation of the data stream query mediator 102 of FIG. 1, and therefore communicates with one or more examples of a DSMS 504 (shown in FIG. 5 as including one or more of a Complex Event Processing (CEP) engine, the Corel 8 DSMS product, and/or the Stream Base DSMS product, all of which are including merely as non-limiting examples. Specifically, a stream application 506 formulates a UWS query 508 to be applied against a data stream of events 510, and forwards the query to a query interface 512 of the integration framework 502.

The query interface 512, as referenced above, may include or be associated with at least the two components of an API and the query language based on Unified Window Specification (UWS). For example, the API may include an enhanced version of JDBC with some additional features advantageous to processing the query 508. For example, such features may include event feeding (which allows a user to feed input events into the system), event subscription (which allows a user to be notified by certain types of detected complex events within the events 510), query submission (which allows a user to submit queries written in the UWS-based query language), and query administration (which allows a user to collect the run-time information and status of a submitted query and also perform some administration operations on the queries (e.g., pause, stop, update)).

For example, a unified window semantics (UWS)-based query language such as described herein may be constructed and implemented as an extension to standard SQL with some additional features specific to event stream processing based on UWS. Such features may include, e.g., both stream declaration and window definition. In this regard, stream declaration may refer to, e.g., description of the sources of input events, intermediate event queues and the connection points of output events. The schema of the events may also be defined in stream declaration.

Window Definition, as already referenced above, is used to define windows on event streams with unified window semantics. The windows on streams can be seen as time-varying relations, where the windows' evolution and evaluation behaviors are explicitly described by UWS, as described herein.

A number of SQL-based event stream query languages exist in the art and may be similar in stream declaration. Therefore, for purposes of clarity and conciseness, the details of example implementations of stream declaration(s) are not included herein, but would be apparent to one of skill in the art.

In contrast, most or all of the existing event-stream query languages vary significantly but often subtly in terms of window definition. With the unified window semantics described herein, the various types of windows provided by different products can be expressed in a unified, intuitive way. Moreover, the UWS-based query language described herein may be translated into vendor-specific DSMS languages, as described herein.

Thus, in FIG. 5, the stream events 510 are received at a federator 514 which receives, aggregates, filters, and otherwise manages the events. For example, the federator 514 may be responsible for determining whether and to what extent some of the data is stored in a persistent data store 522. Examples of such federators are known in the art, and FIG. 5 illustrates an example(s) of how such federators may be extended or otherwise used in the context of the unified window semantics described herein.

Further, a translator 516 may be configured, as referenced herein, to translate the UWS query 508 into a DSM-specific query. Optimization of either the translated query and/or the stream events 510 may occur at optimizer 518, and forwarded by an executer 520 as translated queries 524 and events 526. As shown, the appropriate one of the example DSMS systems 504 may receive the translated query and the events 526, and return results 528 which may then be sent by the executer 520 and/or the query interface 512 to the stream application 506 as result 530.

The translator 516 is described in detail with respect to FIG. 6, below. In general, it may be appreciated that such translation may include translations of syntax, semantics, and/or behaviors. Syntax translation refers generally to exchange of statements in the UWS language/model which have directly corresponding statements in the target dialect. Semantic translation refers generally to statements that do not have directly corresponding statements, but can be expressed in some other way in the target dialect. Finally, behavior translation refers generally to the fact that different systems may have different behaviors when executing the same statement. For example, a statement for a null result may yield an actual null result in one language, but may return no result at all in another language. The translator 516 also may include functionality to verify the translation, e.g., to execute at least part of an original and translated query and compare results.

By way of example, a time-based tumbling window (defined below with respect to FIGS. 8A-8E and associated description) of 60 seconds duration may be expressed in the UWS model as "RANGE 60 second TIME; SYNC 60 second TIME; Evaluate 60 second TIME." In other stream query languages the same window may be expressed differently and obtained through the translator 516. For example, in CCL such a window would be written as "KEEP EVERY 60 SECOND; OUTPUT EVERY 60 SECOND." In StreamBase Stream SQL, the window may be written as "SIZE 60 ADVANCE 60 TIME." In Esper EPL, the window may be written as "win:time_batch(60). Finally, in Extended XQuery, the window may be written as "forseq $w in ext: addTStamp($seq) tumbling_window, start curItem $first when fn:true( ); end curItem $last when ($last/@tstamp-$first/@tstampe) eq 'P60S.'

Figure 6:
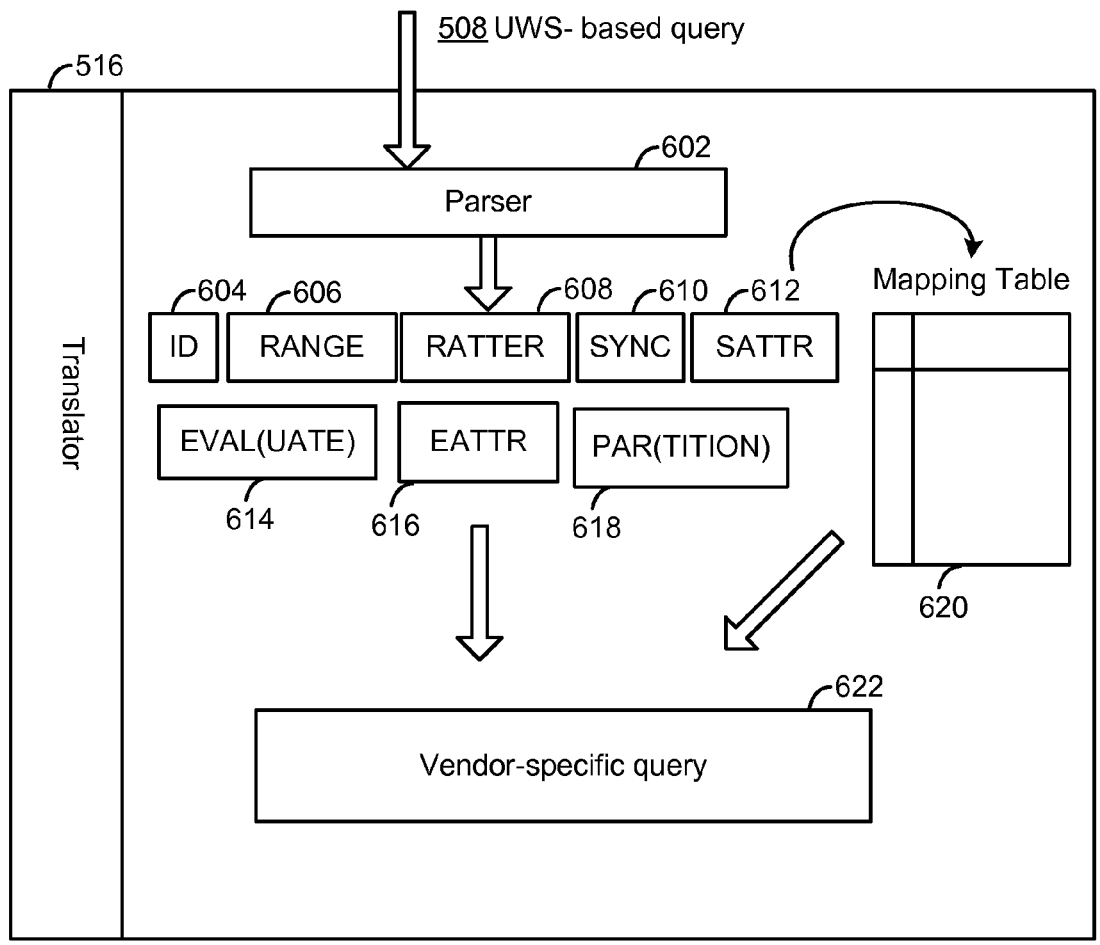
FIG. 6 is a block diagram of the translator of FIG. 5.

FIG. 6 is a block diagram of the translator 516 of FIG. 5. In general, as referenced above, there is a stream declaration translation and a window definition translation. For the former, existing tools may be used in many cases to perform translation. For example, SQL statements may be parsed by a YACC (Yet-Another Compiler-Compiler) parser into an SQL parse tree. XML queries may be translated to SQL using existing tools, as well, such as YAXX, which is an XML extension to YACC.

The translator 516 is also capable of executing translations of window definitions, and, specifically, of UWS model-based windows into vendor-specific window definitions. The translator 516 may use a parser 602 based on a general compiler that supports production rules (e.g. YACC). The parser 602 parses the original query written in the UWS-based query language first, and constructs a parse tree. Then, the translator 516 rewrites the query and window definition in the vender-specific language which can be accepted by, e.g., the underlying CEP engine. In the following examples, two vender-specific languages, StreamSQL and CCL, are used.

When the parser 602 parses the original query, for each window appearing in the query, the parser 602 creates a structure (e.g., tree) which contains the attributes of the window, including ID 604, RANGE 606, RATTR 608, SYNC 610, SATTR 612, EVAL(UATE) 614, EATTR 616, and PAR (TITION) 618. For each vendor-specific language, a mapping table 620 contains the mapping information between a supported UWS pattern in the specific language and the generated syntax for that pattern. The table composed for each vender-specific language is based on the features of the language and the semantics of UWS as described herein, to thereby obtain the vendor-specific query 622.

For each window to be translated, the translator 516 probes the mapping table 620 with the window's attributes and the target language. If no items are found, the translator 516 reports an error indicating the type of window is not supported by the underlying CEP engine. If the item is found, the translator 516 composes the window's definition in the target language according to the pattern in the generated column.

The following tables show the mapping between some typical types of windows in UWS and StreamSQL & CCL. Examples and definitions of the window types are provided below, e.g., with respect to FIGS. 8A-8E and associated discussion. In Tables 1 and 2, where shown, "% RANGE %" and "% SYNC %" represent the values of RANGE and SYNC in the original query.

TABLE 1

Translation examples for StreamSQL

| Language | RANGE | RATTR | SYNC | SATTR | EVAL | EATTR | PAR | Generated |
|---|---|---|---|---|---|---|---|---|
| Time-based Sliding Window with Time-sync | | | | | | | | |
| StreamSQL | ANY | TIME | ANY | TIME | NONE | NONE | NONE | [SIZE % RANGE % ADVANCE % SYNC % TIME] |
| Tuple-based Sliding Window with Tuple-sync | | | | | | | | |
| StreamSQL | ANY | TUPLE | ANY | TUPLE | NONE | NONE | NONE | [SIZE % RANGE % ADVANCE % SYNC % TUPLE] |
| Time-based Sliding Window with Time-sync and Partition | | | | | | | | |
| StreamSQL | ANY | TIME | ANY | TIME | NONE | NONE | ANY | [SIZE % RANGE % ADVANCE % SYNC % TIME PARITITON BY % PAR %] |
| Tuple-based Sliding Window with Tuple-sync and Partition | | | | | | | | |
| StreamSQL | ANY | TUPLE | ANY | TUPLE | NONE | NONE | ANY | [SIZE % RANGE % |

TABLE 1-continued

Translation examples for StreamSQL

| Language | RANGE | RATTR | SYNC | SATTR | EVAL | EATTR | PAR | Generated |
|---|---|---|---|---|---|---|---|---|
| | | | | | | | | ADVANCE % SYNC % TUPLE PARITITON BY % PAR %] |

TABLE 2

Translation examples for CCL

| Language | RANGE | RATTR | SYNC | SATTR | EVAL | EATTR | PAR | Generated |
|---|---|---|---|---|---|---|---|---|
| Time-based Sliding Window with Content-change-eval | | | | | | | | |
| CCL | ANY | TIME | 1 | TUPLE\|TIME | Content Changes | WHEN | NONE | KEEP % RANGE % |
| Tuple-based Sliding Window with Content-change-eval | | | | | | | | |
| CCL | ANY | TUPLE | 1 | TUPLE\|TIME | Content Changes | WHEN | NONE | KEEP % RANGE % |
| Time-based Sliding Window with Time-sync | | | | | | | | |
| CCL | ANY | TIME | ANY | TIME | NONE | NONE | NONE | KEEP % RANGE % OUTPUT EVERY % SYNC % |
| Tuple-based Sliding Window with Tuple-sync | | | | | | | | |
| CCL | ANY | TUPLE | ANY | TUPLE | NONE | NONE | NONE | KEEP % RANGE % OUTPUT EVERY % SYNC % |
| Time-based Sliding Window with Content-change-eval and Partition | | | | | | | | |
| CCL | ANY | TIME | 1 | TUPLE\|TIME | Content Changes | WHEN | ANY | KEEP % RANGE % PER % ANY % |
| Time-based Sliding Window with Time-sync and Partition | | | | | | | | |
| CCL | ANY | TIME | ANY | TIME | NONE | NONE | ANY | KEEP % RANGE % PER % ANY % OUTPUT EVERY % SYNC % |

Figure 7:
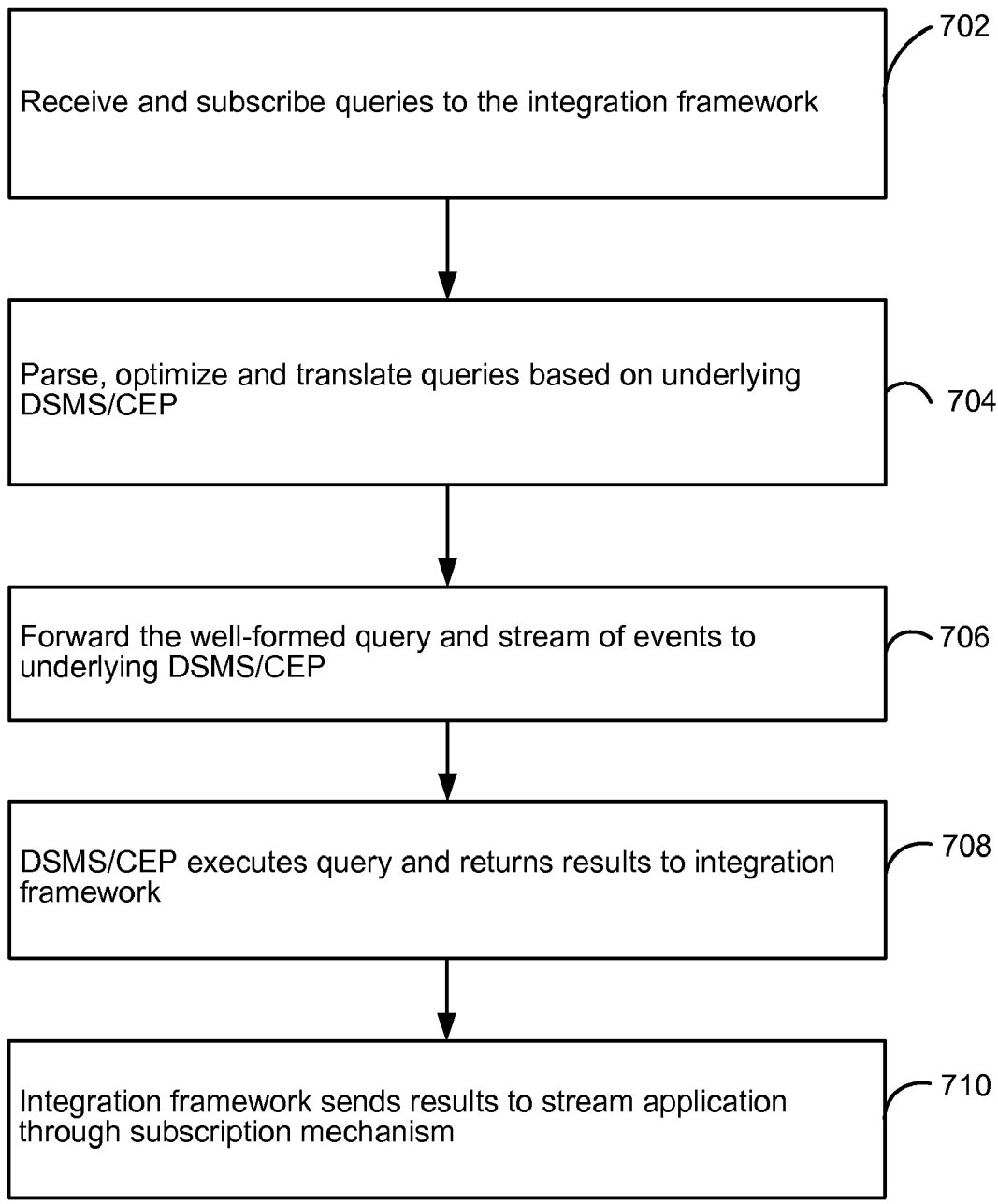
FIG. 7 is a flowchart illustrating example operations of the systems of FIGS. 1 and 4-6.

FIG. 7 is a flowchart 700 illustrating example operations of the systems of FIGS. 1 and 4-6. In FIG. 7, queries may be received and subscribed to the query/integration framework/mediator (702). That is, e.g., the end user, without being aware of the underlying CEP or other DSMS engines, writes queries using the UWS-based query language and subscribes the queries to the integrated system. For example, the query handler 126 of FIG. 1 and/or the query interface 512 of FIG. 5 may be used.

Then, the SQL query may be parsed, re-written, and optimized for translation of the query into different syntax and window models according to which CEP/DSMS engine is being used (704). For example, the translator 516 (and/or optimizer 518) as shown in FIGS. 5 and 6 may be used to execute these functions. The integration framework (query mediator) may then pass the well-written query and the input streaming events (or persistent data sources) to the CEP/DSMS engine (706). The CEP engine or other DSMS executes the query and delivers the results back to the integration framework (708), and, finally, the integration framework may send the query results to the application(s) through the event subscription mechanism (710). Examples of such communications between the components may be observed, e.g., in FIGS. 1 and 5, and may be understood from FIG. 4, as well.

FIGS. 8A-8E are block diagrams of example data streams and specific window definitions. In general, as referenced above, the UWS model and language may be used to express virtually any present or future window. Many such window types are known, and may not generally be described here beyond what is necessary to understand the expression thereof using the UWS model and language. Thus, table 3 provides examples of known window types:

TABLE 3

| Type | Syntax | Description |
|---|---|---|
| Tuple based sliding window | RANGE 5 TUPLES SYNC 1 TUPLE | Basic tuple based sliding window |
| Time based sliding window | RANGE 5 hour TIME SYNC 1 hour TIME | Basic time based sliding window |
| Landmark window | RANGE Unbounded TIME SYNC 1 hour TIME | Landmark window without upper bound |
| Tumbling window | RANGE 5 hour TIME SYNC 5 hour TIME | Tumbling window based on time |
| Time-tuple based sliding window | RANGE 5 hour TIME SYNC 1 TUPLE | Window content is based on time while update based on the tuple arrival |
| Tuple-time | RANGE 10 TUPLES | Connect is based on |

TABLE 3-continued

| Type | Syntax | Description |
|---|---|---|
| based sliding window | SYNC 5 second TIME | tuple while update based on time |
| Now window | RANGE Now TIME SYNC 1 TUPLE | Window content is based on current time |
| On field window | RANGE 5 hour ON FIELD TimestampAmp SYNC 1 hour TIME | Sliding window based on custom field |
| Event-based window | RANGE 50 TUPLES SYNC WHEN Price >100 | The content of the window updates when a specified event happens |
| Partition window | RANGE 5 TUPLES PARTITION BY CarId SYNC 1 TUPLE | Partition window based on CarId field |
| Predicate window | RANGE Temperature >90 ON FIELD SensorID SYNC 5 second TIME | Predicate window for sensor networks |
| Mixed jumping window | RANGE 4 second TIME SYNC 4 second TIME EVALUATE 1 TUPLE | A time based jumping window with a tuple based evaluation |
| Sampling window | RANGE 10 TUPLES SYNC 1 TUPLES EVALUATE 1 hour TIME | Sampling a tuple based sliding window |

With respect to Table 3 and FIGS. 8A-8E, the following formal definitions and equations may be used to understand and express various window types. Specifically, an abstract relational stream is defined as having the following characteristics: a stream consists of tuples; a stream has a relational schema and all its tuples comply with that schema, and a stream develops over time. Therefore it is assumed that there is a set T to represent the time domain, such as wall-clock time or the natural numbers.

Items of a data stream are commonly represented as relational tuples, and a tuple schema has the form:

$$\text{Schema} \langle a_1: A_1; \ldots; a_k: A_k \rangle \quad \text{Eq. (1)}$$

where Schema is a relation symbol, a1; ... ; ak are attributes, and A1; ... ; Ak are types.

A timestamp value may be attached to every streaming tuple as a way of providing order among the data items that flow into the system. Time may be represented as an ordered sequence of distinct moments. Alternatively, simple sequence numbers may also serve as a way to order tuples, e.g., a unique serial number may be attached to each tuple upon admission to the system.

Thus, Time Domain T may be regarded as an ordered, infinite set of discrete time instants τ within T. A time interval [τ1, τ2] within T includes all distinct time instants τ for which $\tau_1$ is less than or equal to τ which is less than or equal to $\tau_2$. Consequently, T may be considered similar to the domain of natural numbers N. The extent of each interval is also a natural number, as it is simply the count of all distinct time instants occurring between its bounds. At each timestamp τ, a possibly large, but always finite number of data elements of the stream arrive for processing. Thus, multi-set semantics apply and duplicates are allowed, signifying that zero, one, or multiple tuples may arrive at any single instant. For multiple tuple arriving at the same time, internal rank (denoted as ir) may be defined to distinguish these tuples in a first-arrival-first-rank fashion.

Then, timestamp together with the internal rank can perfectly define a total order over a stream, which can be called external rank, or just rank. In this sense, Rank R may be regarded as an ordered, infinite set of discrete tuples of rank r within R. A rank interval [r1, r2] within R includes all distinct rank instants r within R for which $r_1$ is less than or equal to r which is less than or equal to $r_2$. Then, a data stream S is the result of a mapping T→$2^\Omega$, which at each instant τ returns a finite subset from the set Ω of tuples.

One supplementary attribute ts (i.e., may not be explicitly included in the schema) is designated as the timestamp of tuples and takes its ever-increasing values from T. Rank mapping may also be used to define the data stream with another supplementary attribute r (external rank). For any tuple s1 and s2 within S, $$s_1.r > s_2.r \Longleftrightarrow (s_1.ts > s_2.ts) \vee (s_1.ts = s_2.ts \wedge s_1.ir > s_2.ir) \quad \text{Eq. (2)}$$

One difference between timestamp and rank is the former defines a partial order over a stream while the latter defines a total order.

Current stream contents S (τi) of a data Stream S at time instant τi is the set $S(\tau_i) = \{s \in S | s.ts \leq \tau_i\}$. Temporal ordering is important in stream processing because data items should be given for processing in accordance with their timestamps. As a general rule, when evaluating a continuous query at time τ, all stream tuples with timestamps up to that particular τ must be available. Hence, no item should propagate for further execution if its timestamp value is less than the latest tuple produced by the system. Handling out-of-order tuples is possible but is not described here in detail.

The results of a continuous query on data stream may be considered as a union of the sets of tuples returned from successive query evaluations over the current stream contents at every distinct time instant. That is, a continuous query over stream may be defined such that CQ is a continuous query submitted at time instant τ0 on data stream S. The results RCQ that would be obtained at τi are the union of the subsets CQ (S(τ)) of qualifying tuples produced from a series of one-time queries CQ on successive stream contents S(τ), as shown in Eq. (3).

$$R_{CQ}(S(\tau_i)) = U_{\tau_0 \leq \tau \leq \tau_i} CQ(S(\tau)) \quad (\forall \tau_i \in T, \tau_i \geq \tau_0) \quad \text{Eq. (3)}$$

To effectively evaluate a continuous query, queries may be accepted with append-only results, thus not allowing any deletions or modifications on answers already produced. This class of continuous queries is called monotonic, so that a monotonic continuous query (where, in this context, monotonicity refers to query results but not to incoming stream items.) is defined as a continuous query CQ applied over data stream S such that $$CQ(S(\tau)) \subseteq CQ(S(\tau + \epsilon)) \quad (\forall \tau \in T \wedge \epsilon \geq 0) \quad \text{Eq. (4)}$$

The above definitions and descriptions may be generalized for multiple input streams.

In order to bound the increasing memory requirements of query operators, sliding windows are usually applied over the infinite streams and always return a finite portion of the most recent data items. However, continuous queries specifying sliding windows over streams are non-monotonic, since new results are produced but some older ones are expired due to window movement. The UWS model and language described herein is flexible enough to be used under any of the aforementioned interpretations of continuous queries.

In most data stream prototype or industrial systems, submission of continuous queries is accompanied by, e.g., sliding, window specifications on any stream involved in the query. Then, a window over data stream W may be defined as a window with conjunctive policy P applied at time instant τ0 over a data stream S. Then Eq. (5) may be defined as follows.

$$W^P(S(\tau_i)) = \{s \in S(\tau_i) | P(s, \tau_i) \text{holds}\} (\forall \tau_i \in T, \tau_i \geq \tau_0) \quad \text{Eq. (5)}$$

provided that |WP(S(τi))| is less than or equal to n, for any large, but always finite n within N.

Therefore, each window is applied over the items of a single data stream S and at every $\tau_i$ returns a concrete finite set of tuples $W^P(S(\tau_i)) \subset S(\tau_i)$ which is called the window state at this time instant. P is the policy described above, so that $W^\alpha$ defines the set of tuples for window content while $W^\beta$ and $W^\chi$ define the sets of time points for window evolution/update and evaluation.

Figure 8A:
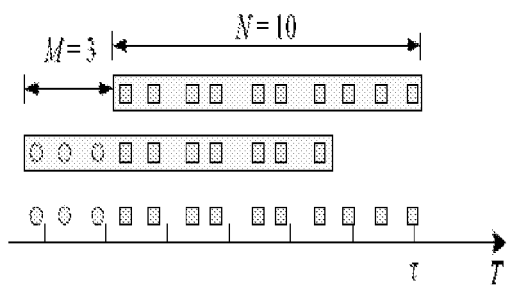
FIGS. 8A-8E are block diagrams of example data streams and specific window definitions.

Using the above examples and notations, various types of windows may be described and illustrated with respect to FIGS. 8A-8E. For example, a tuple-based sliding window is shown in FIG. 8A, in which, for every time instant $\tau$, a typical tuple-based window covers the most recent N tuples of a stream S, as shown.

$$W_{tuple}^\alpha(\alpha=N, \tau) = \{s \in S(\tau) | (r_i - N + 1 \leq s.r \leq r_i \wedge r_i \geq N)$$
$$\vee (s.r < \eta \wedge \eta \leq N)\} \quad \text{Eq. (6)}$$

$$W_{tuple}^\beta(\beta=M, \tau) = \{s \in S(\tau) | s.r = M \times j, j \in N\} \quad \text{Eq. (7)}$$

where ri is the latest tuple received before time instant $\tau$.

When N=1 ($\alpha$-policy), window states are determined by single-tuple unit, and when M>1 ($\beta$-policy), the window content updates after multiple tuples arrive specified by M. FIG. 8A shows an example where M=3 and N=10. The above equations imply the method utilized to identify qualifying tuples, e.g., starting from the current time instant $\tau$ and going steadily backwards in time, tuples are being obtained until their total count exceeds threshold N. A similar case, but concerning timestamped tuples, arises when ties may occur when only k elements need to be chosen out of a batch of m>k tuples corresponding to the lower bound of the window, in order to reach the predefined total count N. As a convenient way to resolve this problem, tuples may be selected in a first-appear-first-select fashion. The rank attribute described above may be utilized to handle this situation.

Besides $\alpha$-policy and $\beta$-policy, $\chi$-policy may be applied on tuple-based sliding windows. For every natural number K within N, a tuple-based $\chi$-policy triggers the evaluation over the window every K-th tuple of a stream, as shown in Eq. (8):

$$W_{tuple}^\chi(\chi=K, \tau) = \{s \in S(\tau) | s.r = K \times j, j \in N\} \quad \text{Eq. (8)}$$

Figure 8B:
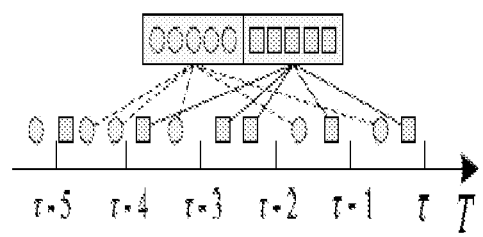

In addition to tuple-based windows, partitioned windows may also be defined. The semantics of this window type is applied to the streaming tuples by first partitioning them according to a subset $\{A1, A2, \ldots, Ak\}$ of grouping attributes. Therefore, several sub-streams are derived, each one corresponding to an existing combination of values $<a1, a2, \ldots, ak>$ on the grouping attributes. From each partition the most recent N elements are taken and the union of these subsets provides the final set of window tuples. FIG. 8B shows an example where n=5. It may be noted that the windowing attribute (timestamp) is not allowed to participate in the list of grouping attributes. Formally, such a window may be described as in Eq. (9)

$$W_{partition}^\alpha(\alpha=N \wedge A, \tau) = \{s \in S(\tau) | \forall A_k \in A, s.A_k = a_k$$
$$\wedge (r'_i - N + 1 \leq s.r' \leq r'_i \wedge r'_i \geq N) \vee (s.r' < r'_i$$
$$\wedge r'_i \leq N)\} \quad \text{Eq. (9)}$$

where r' re-ranks the tuples regarding every unique combination of values on all the attributes listed in A. In contrast to usual relational semantics, aggregate functions (like SUM, AVG, etc.) cannot generally be applied to the partitions directly. Further, it may be observed that tuple-based windows may be regarded as a special case of partitioned windows where all tuples of the stream get assigned to a single partition.

Landmark windows may also be defined. In this regard, in logical windows, the timestamp values of streaming tuples are checked for inclusion within a pre-defined temporal interval. This requirement may be expressed by means of a range function that may be defined for each window type as a mapping from time domain T to the domain of possible time intervals, as shown in Eq. (10).

$$\text{Range: } T \rightarrow \{[\tau_1, \tau_2] | \tau_1, \tau_2 \in T, \tau_1 \leq \tau_2\} \quad \text{Eq. (10)}$$

Essentially, at every time instant the range function returns the window bounds (but not its actual contents). Landmark windows maintain one of their bounds fixed at a specific time instant, letting the other follow the evolution of time. Therefore, streaming tuples of S with timestamps that qualify for the range of landmark window are returned as its state at every time instant $\tau$, as shown in Eq. (11):

$$W_{landmark}^\alpha(\alpha=\infty, \tau) = \{s \in S(\tau) | s.ts \in [\tau_0, \tau]\} \quad \text{Eq. (11)}$$

This window type keeps appending new tuples indefinitely, unless either the query is explicitly revoked or the stream is exhausted and no tuples enter into the system anymore.

Time-based sliding windows may be the most common class of windows over data streams, defined by means of time units (where, as described, physical windows also slide as new tuples arrive). For $\tau 0$ as the time instant that a continuous query is initially submitted specifying a sliding window Ws. The range of this sliding window may be defined as a function of time, as shown in Eqs. (12-14):

$$\text{range}(\alpha, \tau) = \begin{cases} [\tau_0, \tau] & \text{if } \tau_0 \leq \tau < \tau_0 + \alpha \\ [\tau - \alpha + 1, \tau] & \text{if } \tau \geq \tau_0 + \alpha \end{cases} \quad \text{Eqs. (12-14)}$$

$$W_{time}^\alpha(\alpha, \tau) = \{s \in S(\tau) | s \cdot ts \in \text{range}(\alpha, \tau)\}$$

$$W_{time}^\beta(\beta, \tau) = \{\tau_i \in T | \tau_i = \beta \times j \wedge \tau_i \leq \tau \wedge j \in \mathbb{N}\}$$

It may be noted that $\tau 0$ and $\tau$ are expressed in timestamp values, whereas parameters $\alpha$, $\beta$ are actually sizes of time intervals. For the sake of clarity, all parameters may be considered as natural numbers according to the definition of the Time Domain T, so the range function is evaluated at discrete time instants of T. Then, for every time instant $\tau$, the qualified tuples are included in the window.

Figure 8C:
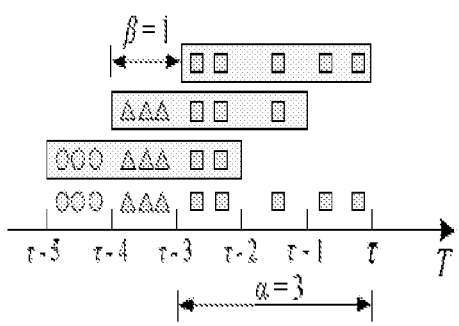
Figure 8D:
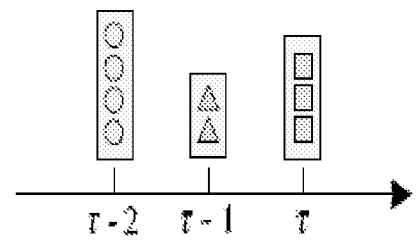

In the most general case where $\alpha > \beta$, overlaps are observed between the extents of any two successive states of a sliding window, thus a subset of their contents remains intact across states, as shown in the example of FIG. 8C. This definition also allows for the existence of "half-filled" windows with extent less than $\alpha$ at early evaluation stages, so the window may be considered as being gradually filled with tuples. As soon as the extent reaches its capacity, the window starts replacing some older tuples with newly arriving ones. Meanwhile, evolution step $\beta$ may be set equal to the smallest granularity of time in a system, so that the window slides smoothly in pace with the advancement of time.

When $\chi$-policy is applied on time based sliding windows, for every time instant $\tau$ a time-based $\chi$-policy evaluates windows at timestamp $j \times K$, where j is within N and K is the $\chi$-value that indicates the interval time for evaluation, as shown in Eq. (15):

$$W_{time}^\chi(\chi, \tau) = \{\tau_i \in T | \tau_i = \chi \times j \wedge \tau_i \leq \tau \wedge j \in N\} \quad \text{Eq. (15)}$$

Figure 8E:
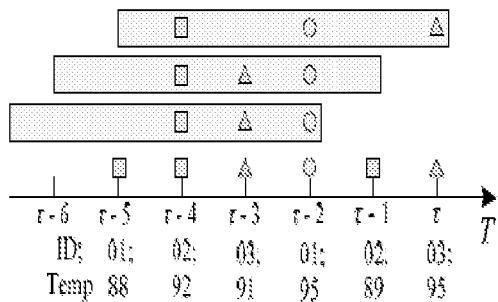

By setting $\tau = \text{NOW}$, $\alpha = 1$ and $\beta = 1$ in the definition of range function, it is very easy to express an important class of sliding windows known as NOW windows that obtain the current instance $S(\tau) - S(\tau-1)$ of the stream, i.e., all the tuples that arrive at the current timestamp, as shown in FIG. 8E.

For tumbling windows, the range function defined for sliding windows is generic enough to express windows with arbitrary evolution step (even α<β). Tumbling windows accept streaming tuples in "batches" that span a fixed time interval. This is particularly useful when aggregates must be computed over successive, yet non-overlapping portions of the stream, in a way that no tuple takes part in computations more than once. Usually, a new window state is created as soon as the previous one has ceased to exist by simply setting β=α.

A predicate-window query PQ is defined over data stream S with window predicates defined over the tuples in S. At any time instance τ, the answer to PQ equals the answer to a snap-shot query PQ', where PQ' is issued at time τ and the inputs to PQ' are the tuples in stream S that qualify the predicate at time τ.

For example, an input tuple si from stream S may have the following schema: si<CORAttr; PAttrs; Attrs>, where CORAttr is the correlation attribute, PAttrs are the attributes over which the predicate Pi is defined and Attrs are the other attributes. Then, a tuple si qualifies the predicate Pi at time τ, iff: a) si arrives in the stream at point in time before τ, b) s.PAttrs qualifies Pi and 3) There is no stream tuple s' that arrives after s and s'.ID=s.ID. FIG. 8E shows an example of a predicate window.

Figure 9:
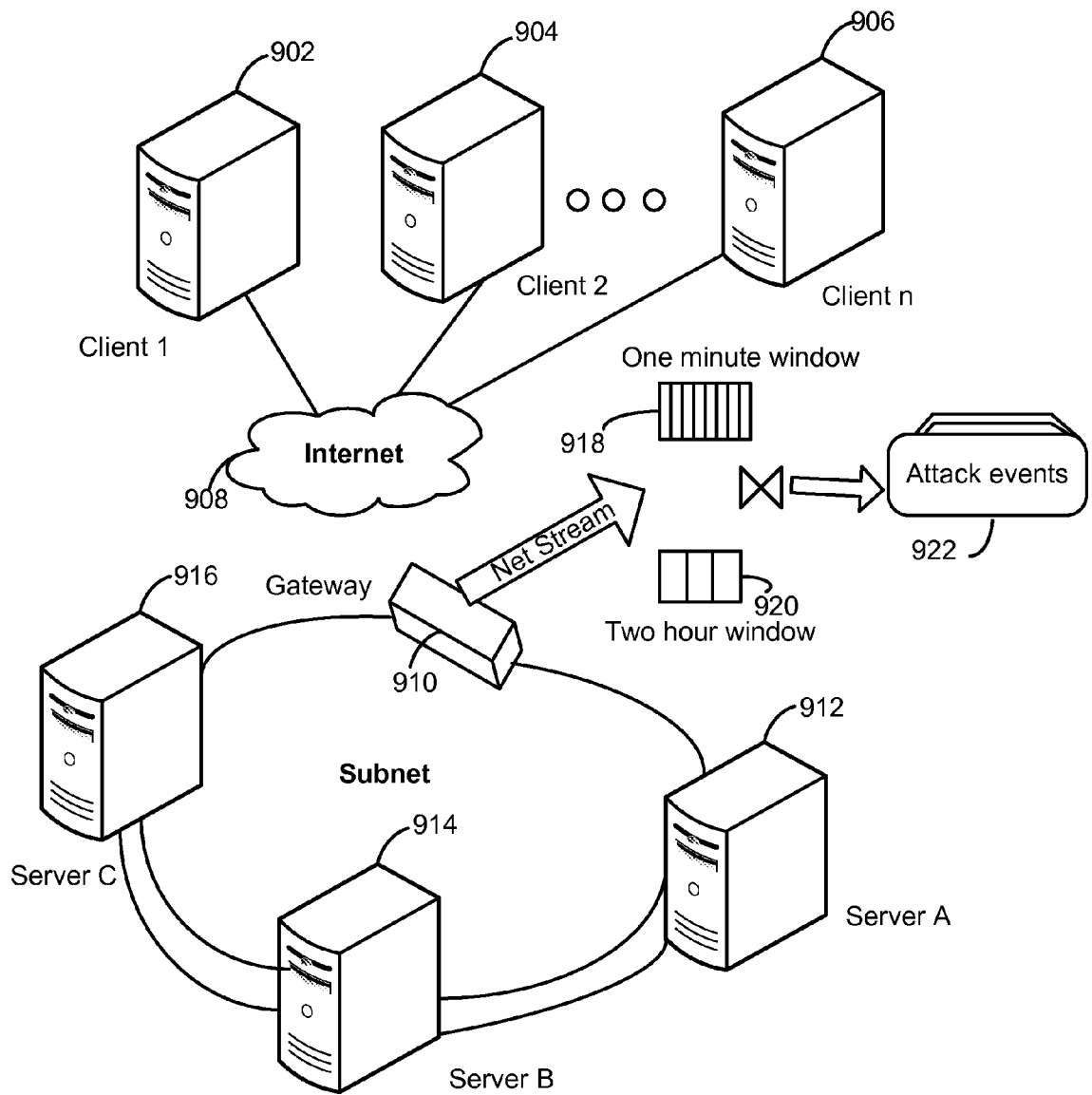
FIG. 9 is a block diagram illustrating an example scenario in which the systems of FIGS. 1 and 4-6 may be implemented.

FIG. 9 is a block diagram illustrating an example scenario in which the systems of FIGS. 1 and 4-6 may be implemented. In FIG. 9, client computers 902-906 communicate over the Internet 908 and through a gateway 910 with servers 912-916, as shown. A data stream referred to herein as Netstream may be monitored using the system(s) of FIGS. 1 and/or 4-6 and may be analyzed using a one minute window 918 and a two hour window 920 to determine attack events 922 from malicious users, as described below.

More specifically, FIG. 9 illustrates a network monitoring system monitoring problems caused by overloaded and/or crashed servers, network connections or other devices, where the goal is to detect abnormal network traffic flowing into a subnet (e.g., 910-916) and identify potential attacks (e.g. denial of service attacks).

Here the following rules may be used to define a potential attack. First, the overall incoming traffic volume from Internet to the subnet at gateway 910 within the last one minute is larger than a user-defined threshold. Second, the total traffic volume from a specified source to the subnet at gateway 910 within the last two hours is larger than a user-defined threshold.

In this case, the input stream, NetStream, is a stream of incoming IP packet summaries (collected by the gateway 910), where each tuple has a source IP address (srcIP), destination IP address (destIP), packet size (pSize) and timestamp (pTime), so that NetStream may be expressed as NetStream(srcIP string, destIP string, pSize int, pTime timestamp).

To implement this scenario with the UWS model and language and associated framework as described herein, a time-based sliding window may be defined over NetStream to watch the traffic through the gateway 910 within the last minute. If the traffic is abnormal, potential attackers are further investigated through the historical traffic information provided by a two-hour window.

For example, such a query may be expressed as:

```
SELECT s1.srcIP, COUNT(*), SUM(s2.pSize)
FROM NetStream
[ RANGE 1 minute TIME
SYNC 5 second TIME
EVALUATE WHEN COUNT(*) > threshold1 OR
SUM(pSize) > threshold2 ]
AS s1,
NetStream
[ RANGE 2 hour TIME
SYNC 1 minute TIME
EVALUATE WHEN FALSE ]
AS s2
WHERE s1.srcIP = s2.srcIP
GROUP BY s1.srcIP
HAVING COUNT(*) > threshold3 AND
SUM(s2.pSize) > threshold4
;
```

The four thresholds in the query are user-defined parameters according to the characteristics of attacks under different situations. In the above query, the one-minute window triggers the evaluation for the whole query when a specific event happens (i.e. the abnormal incoming traffic in the last one minute), while the two-hour window acts in a passive way, which synchronizes its content every one minute but never triggers an evaluation so as to avoid unnecessary joins between the two windows.

Then, the above query may be translated into StreamSQL using the techniques described above to obtain the StreamSQL query

```
CREATE STREAM TempStream;
SELECT s1.srcIP, COUNT(*) AS count
FROM NetStream
[SIZE 60 ADVANCE 5 TIME]
HAVING COUNT(*) > threshold1
INTO TempStream;
CREATE MATERIALIZED WINDOW Named_win(srcIP string,
    destIP string, pSize int, pTime timestamp)
AS NetStream
[SIZE 7200 ADVANCE 60 TIME]
;
SELECT s1.srcIP, s1.count, sum(s2.pSize)
FROM
TempStream AS s1
OUTER JOIN
Named_win AS s2
WHERE s1.srcIP = s2.srcIP
    AND s1.count > threshold2
HAVING SUM(s2.pSize) > threshold3
INTO ResultStream
;
``` for submission to a StreamSQL-based DSMS.

Additionally, or alternatively, the same query may be translated from the UWS to CCL using the techniques described above for translation to obtain

```
CREATE STREAM TempStream;
INSERT INTO TempStream
SELECT s1.srcIP, COUNT(*) AS count
FROM NetStream
KEEP 1 minute
HAVING COUNT(*) > threshold1
OUTPUT EVERY 5 second;
CREATE WINDOW Named_win(srcIP string, destIP string,
    pSize int, pTime timestamp)
KEEP 2 hours
;
INSERT INTO Named_win
SELECT * FROM NetStream
;
```

```
INSERT INTO ResultStream
SELECT s1.srcIP, s1.count, sum(s2.pSize)
FROM
    TempStream AS s1
    LEFT OUTER JOIN
    Named_win AS s2
    WHERE s1.srcIP = s2.srcIP
        AND s1.count > threshold2
    HAVING SUM(s2.pSize) > threshold3
;
``` for submission to a CCL-based DSMS.

Thus, the above description of FIGS. 1-9 provides examples for the design and implementations of a framework that integrates the representation of two kinds of event streams (relational and XML streams) in a way that supports unified event processing with a unified window specification. This unified window specification is semantically clear and easy to understand. It can be used to express virtually all types of windows, and is also easily extensible to new types of windows that may occur in the future. Furthermore, as described, the unified window specification may be easily translated into other vendor-specific stream processing languages with the described framework.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system including instructions recorded on a non-transitory computer-readable medium, the system comprising:
   a query handler configured to receive a query from a stream application to be applied against a stream of data including multiple tuples representing events;
   a stream window manager configured to express the query in a specification which defines a window including a subset of the tuples, the specification defining content of the window as a range of the tuples having a range attribute over which the content is specified, defining when to update the window using a synchronization attribute specifying a movement of the window over time with respect to the content, and defining an evaluation of the content of the window using an evaluation attribute specifying when to perform the evaluation;
   a query translator configured to translate the query into any one of a plurality of stream processing languages of a data stream management system (DSMS), and configured to translate the query into a stream processing language of the plurality of stream processing languages including mapping the range attribute, the synchronization attribute, and the evaluation attribute to the stream processing language of the data stream management system (DSMS), to thereby obtain a translated query; and
   a DSMS mediator configured to provide the translated query to the DSMS for processing therewith.

2. The system of claim 1 comprising:
   a result manager configured to receive query results from the DSMS specified according to the stream processing language and translate the received query results accord- 3. The system of claim 1 wherein the range attribute includes a specification of a number of the tuples.

4. The system of claim 1 wherein the range attribute includes a specification of time.

5. The system of claim 1 wherein the range attribute includes a specification of one or more fields of the stream of data.

6. The system of claim 1 wherein the range attribute includes a specification of a detected pattern associated with the tuples.

7. The system of claim 1 wherein the synchronization attribute includes a specification of a number of the tuples.

8. The system of claim 1 wherein the synchronization attribute includes a specification of a time to update the window.

9. The system of claim 1 wherein the synchronization attribute includes a specification of a detected pattern associated with the tuples.

10. The system of claim 1 wherein the evaluation attribute includes a specification of one or more of the tuples.

11. The system of claim 1 wherein the evaluation attribute includes a specification of time to evaluate the window.

12. The system of claim 1 wherein the evaluation attribute includes a specification of a detected pattern associated with the tuples to trigger evaluation of the window.

13. The system of claim 1 wherein the query translator comprises a compiler configured to parse the query, and is further configured to select a mapping table associated with the stream processing language associated with the DSMS and to execute therewith a mapping of the parsed query to provide a syntax translation, semantic translation, and behavior translation of the query to obtain the translated query.

14. The system of claim 1 wherein the stream of data includes one or more streams of data expressed as either relational or XML data streams, or combinations thereof, and wherein the query translator is configured to translate any of relational or XML data streams, or combinations thereof, into the stream processing language.

15. A computer-implemented method comprising:
receiving a query from a stream application to be applied against a stream of data including multiple tuples representing events;
expressing the query in a specification which defines a window including a subset of the tuples, the specification defining content of the window as a range of the tuples having a range attribute over which the content is specified, defining when to update the window using a synchronization attribute specifying a movement of the window over time with respect to the content, and defining an evaluation of the content of the window using an evaluation attribute specifying when to perform the evaluation;
translating the query into any one of a plurality of stream processing languages of a data stream management system (DSMS), including translating the query into a stream processing language of the plurality of stream processing languages including mapping the range attribute, the synchronization attribute, and the evaluation attribute to the stream processing language of the data stream management system (DSMS), to thereby obtain a translated query; and
providing the translated query to the data stream management system for processing therewith.

16. The method of claim 15 comprising:
receiving query results from the DSMS specified according to the stream processing language; and
translating the received query results according to the specification to thereby provide the results to the stream application.

17. The method of claim 15 wherein the translating the query comprises:
parsing the query;
selecting a mapping table associated with the stream processing language associated with the DSMS; and
executing therewith a mapping of the parsed query to provide a syntax translation, semantic translation, and behavior translation of the query to obtain the translated query.

18. A computer program product, the computer program product being tangibly embodied on a computer-readable medium and comprising instructions that, when executed, are configured to cause a data processing apparatus to:
receive a query from a stream application to be applied against a stream of data including multiple tuples representing events;
express the query in a specification which defines a window including a subset of the tuples, the specification defining content of the window as a range of the tuples having a range attribute over which the content is specified, defining when to update the window using a synchronization attribute specifying a movement of the window over time with respect to the content, and defining an evaluation of the content of the window using an evaluation attribute specifying when to perform the evaluation;
translate the query into any one of a plurality of stream processing languages of a data stream management system (DSMS), including translating the query into a stream processing language of the plurality of stream processing languages including mapping the range attribute, the synchronization attribute, and the evaluation attribute to the stream processing language of the data stream management system (DSMS), to thereby obtain a translated query; and
provide the translated query to the data stream management system for processing therewith.

19. The computer program product of claim 18 wherein the instructions further cause the data processing apparatus to
receive query results from the DSMS specified according to the stream processing language; and
translate the received query results according to the specification to thereby provide the results to the stream application.

20. The computer program product of claim 18 wherein the instructions further cause the data processing apparatus to translate the query including:
parsing the query;
selecting a mapping table associated with the stream processing language associated with the DSMS; and
executing therewith a mapping of the parsed query to provide a syntax translation, semantic translation, and behavior translation of the query to obtain the translated query.

\* \* \* \* \*